(12) United States Patent
Lu

(10) Patent No.: US 7,075,207 B2
(45) Date of Patent: Jul. 11, 2006

(54) STATOR OF BRUSHLESS DIRECT CURRENT MOTOR

(75) Inventor: En-Bing Lu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/919,549

(22) Filed: Aug. 16, 2004

(65) Prior Publication Data

US 2005/0035679 A1 Feb. 17, 2005

(30) Foreign Application Priority Data

Aug. 16, 2003 (CN) .............................. 03 1 40200

(51) Int. Cl.
*H02K 1/00* (2006.01)
(52) U.S. Cl. ................. 310/195; 310/179; 310/184; 318/254
(58) Field of Classification Search ........ 310/179–200, 310/68 R, 68 C, 254, 258, 259; 318/254
See application file for complete search history.

(56) References Cited

U.S. PATENT DOCUMENTS

| 5,661,351 | A | | 8/1997 | von der Heide et al. |
| 5,841,261 | A | * | 11/1998 | Nojima et al. .............. 318/696 |
| 5,952,856 | A | * | 9/1999 | Horiguchi et al. .......... 327/110 |
| 6,465,918 | B1 | * | 10/2002 | Itami et al. ................ 310/68 B |
| 6,707,210 | B1 | * | 3/2004 | Hsieh ......................... 310/179 |
| 6,781,332 | B1 | * | 8/2004 | Kusase ....................... 318/254 |

* cited by examiner

*Primary Examiner*—Thanh Lam
(74) *Attorney, Agent, or Firm*—Wei Te Chung

(57) ABSTRACT

A stator (1) includes a core member (10) having a central portion (12) with an even number of pole members (14–17) extending radially and outwardly from the central portion, a winding having a same even number of winding portions (20a–d) wound around the pole members respectively, and a drive circuit (50) having the winding connected thereto. A half of the winding portions is arranged in parallel with the other half of the winding portions. During working, the electric current passes the whole winding in alternate direction to establish alternate magnetic fields to drive a rotor of the motor to run.

11 Claims, 4 Drawing Sheets

STATOR OF BRUSHLESS DIRECT CURRENT MOTOR

TECHNICAL FIELD

The present invention relates generally to brushless direct current motors, and more particularly to brushless direct current motors having stators for use in computer cooling fans or disk drives.

BACKGROUND

With the continuing development of computer electronics technology, new electronic packages such as the latest CPUs can perform more and more functions. Heat generated by these modem electronic packages has increased commensurately. The heat has become an impediment for continuous development of the CPUs. Cooling fans used for helping heat dissipation of these electronic packages are required to provide increasing airflow, which is usually measured by a unit of CFM (Cubic Feet Per Minute). To increase the CFM value of airflow passing these electronic packages, increasing rotational speed of the cooling fans is a useful way.

Another fact not to harmonize with the development of the CPUs is that, in spite of the high speed of the latest CPUs, other peripheral devices that incorporate with the CPUs, such as hard disk drives or optical disk drives, run at a relatively slower speed. Unfortunately, these slowly operated peripheral devices, not the fast-operated CPUs, determine the overall performance of computer systems. Therefore, to enhance the overall performance of the computer system, it is desired to improve the operation speed of the disk drives. This improvement requires a higher rotational speed of motors of the disk drives.

In any one of these cooling fans or peripheral devices, a brushless direct current motor is usually included to drive a blade set or a disk. A typical brushless direct current motor comprises a stator and rotor pivotably installed about the stator. The blade set of the cooling fan or the disk of the disk drive is carried by the rotor to run. In order to increase the rotational speed of the cooling fan or the disk drive, the motor must output a larger torque to drive the blade set or the disk to run faster.

On the other hand, in addition to being used in computer field, brushless direct current motors are increasingly utilized in home appliances such as refrigerators or air conditioners, office instruments such as copy machines, printers or the like. Employment of more and more motors consumes considerably large electrical energy. Nowadays, saving energy is an important issue for designs of electronic products. Therefore, it is desired to increase the efficiency of the motors of transferring electrical energy to rotational mechanical energy.

For the foregoing reasons, there is a need for a brushless direct current motor which can provide an improved torque and has an improved efficiency.

SUMMARY OF THE INVENTION

The present invention is directed to a stator of a brushless motor which has an improved efficiency.

The present invention is further directed to a stator of a brushless motor which can provide an improved torque.

A stator having features of the present invention comprises a core member having a central portion with an even number of pole members extending radially and outwardly from the central portion, a winding having a same even number of winding portions wound around the pole members respectively, and a drive circuit having the winding connected thereto with an electric current passing through the winding periodically in alternate directions during working. A half of the winding portions is arranged in parallel with the other half of the winding portions. During the first half of an operation period, the electric current passes through the whole winding in a first direction, while during the other half of the operation period, the electric current passes through the whole winding in an opposite second direction, thereby establishing periodically alternate magnetic fields to drive a rotor of the motor to run.

Other objects, advantages and novel features of the present invention will be drawn from the following detailed description of the preferred embodiments of the present invention with attached drawings, in which:

DESCRIPTION OF PREFERRED EMBODIMENTS

Figure 1:
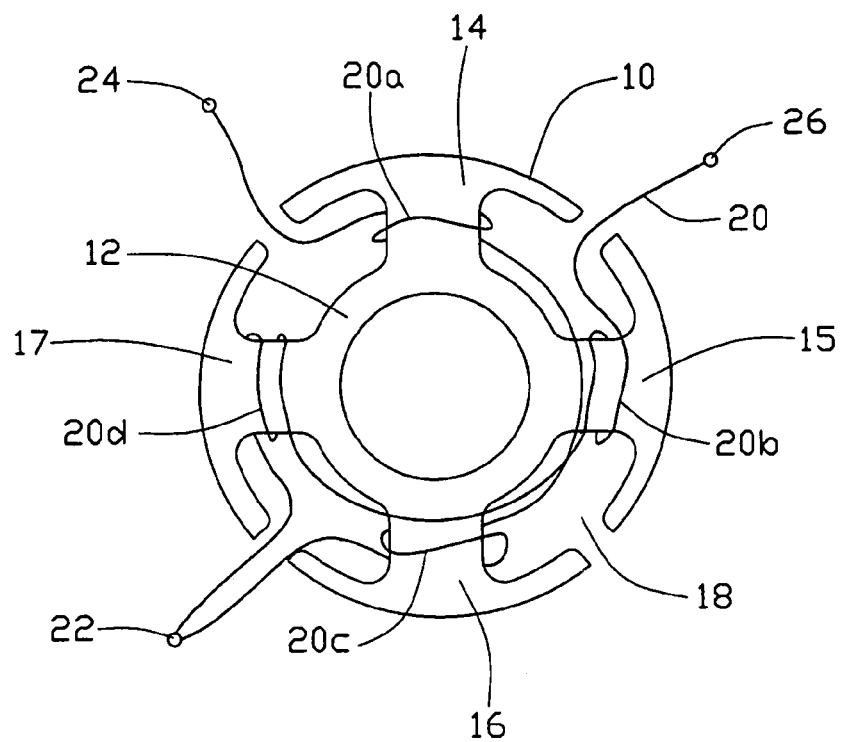
FIG. 1 is a schematic, top view of a preferred embodiment of a brushless direct current motor embodying features of the present invention in which the top of the rotor has been cut away.
Figure 2:
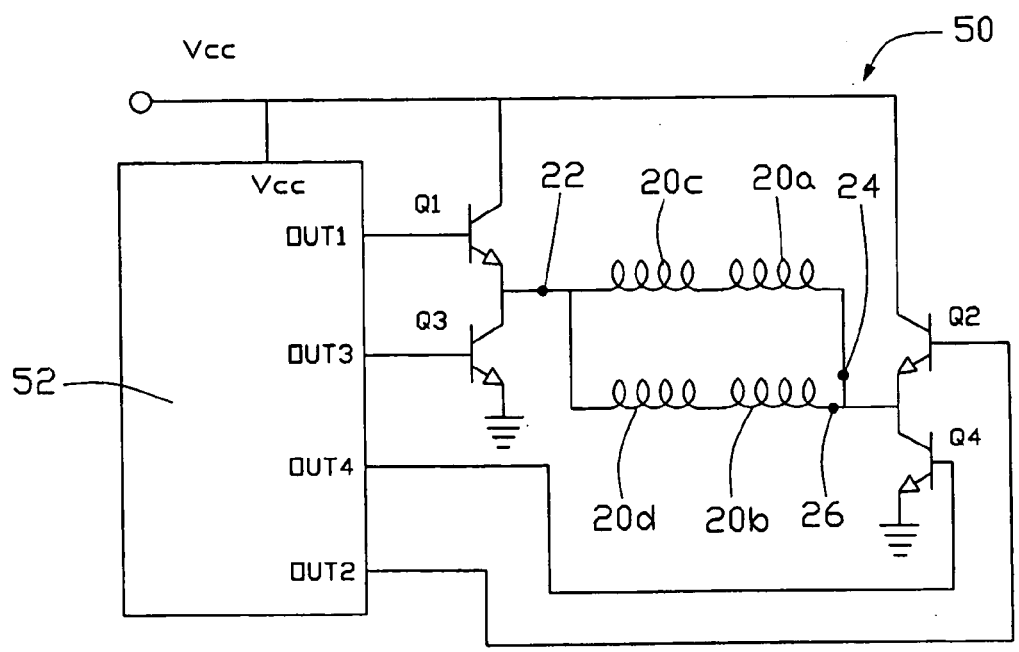
FIG. 2 is a schematic view of a circuit diagram for the motor of FIG. 1.

FIGS. 1 and 2 schematically illustrate a stator of a brushless direct current motor (hereinafter referred to as the "motor"). The stator comprises a core member 10, a winding 20 wound around the core member 10, and a drive circuit 50 connected with the winding 20. Under the control of the drive circuit 50, an electric current passes through the winding 20 periodically in alternate directions to establish alternate magnetic fields to drive a rotor (not shown) of the motor to run.

The core member 10 has an annular central portion 12 defining a central aperture through which a bearing housing (not shown) and a rotor shaft (not shown) passes. Four pole members 14–17 extend radially and outwardly from the central portion 12 at regular intervals along the periphery of the central portion 12, so that every two adjacent pole members such as the pole member 14 and pole member 15 extend with an included angle of 90°. A winding slot 18 is defined between every two adjacent pole members to receive the winding 20.

The winding 20 comprises four winding portions 20a–20d wound around the four pole members 14–17 respectively. The wire forming the winding 20 begins at a start terminal 24. Viewed along a radial direction from the central portion 12, the winding portion 20a is wound in a counterclockwise direction around the pole member 14, and then the wire of the winding 20 extends to the pole member 16 with the winding portion 20c being wound therearound in a counterclockwise direction. The wire of the winding 20 is then led out of the stator to form a middle terminal 22. Afterwards, the wire of the winding 20 extends to the pole member 17 where the winding portion 20d is wound around the pole member 17 in a the counterclockwise direction. The wire of the winding 20 then extends to the pole member 15 with the winding portion 20b being wound therearound in the counterclockwise direction. Finally, an end terminal 26 of the winding 20 is led out of the stator. Alternatively, after the middle terminal 22 is led out of the stator, the wire of the winding 20 extends to the pole member 15 to form the winding portion 20b, and then extends to pole member 17 to form the winding portion 20d.

In the stator described above, the winding 20 is wound around two opposite pole members 14, 16 to form the winding portions 20a, 20c, and is then wound around another two opposite pole members 15,17 to form the winding portions 20b, 20d. The winding portions 20a–20d are all wound in the counterclockwise direction. Alternatively, the winding portions 20a–20d are all wound in the clockwise direction.

Referring to FIG. 2, the drive circuit 50 comprises an IC 52 (Integrated Circuit) such as an IC identified by the number LB11961 produced by SANYO®. The IC 52 has four output terminals named OUT1–OUT4. The IC 52 also has input terminals (not shown) that are used for receiving information such as signals from Hall sensors for detecting positions of the rotor. Depending on such information, the IC 52 can output high or low voltage signals through its output terminals OUT1–OUT4.

The drive circuit 50 also comprises two pairs of transistors identified by Q1, Q3 and Q2, Q4. The emitters of the transistors Q1, Q2 are connected to the collectors of transistors Q3, Q4 respectively. The collectors of the transistors Q1, Q2 are connected to power source Vcc. The emitters of the transistors Q3, Q4 are grounded. The bases of the transistors Q1 to Q4 are connected to the OUT1 to OUT4 of the IC 52 respectively.

The middle terminal 22 of the winding is electrically connected to the junction of the emitter of the transistor Q1 and the collector of the transistor Q3, and the start terminal 24 and the end terminal 26 are commonly connected to the junction of the emitter of the transistor Q2 and the collector of the transistor Q4, so that the winding portions 20a, 20c are arranged in parallel with the winding portions 20b, 20d.

In operation, the electrical current flowing in the winding 20 reverses at time points with regular intervals therebetween. A term "operation period" hereinafter is defined by the time between two closest time points where the electrical current reverses from a same first direction to a same second direction. In a first half of the operation period, the OUT1 and OUT4 of the IC 52 are at a high voltage level, while the OUT2 and OUT3 of the IC 52 are at a low voltage level. The voltage levels of the OUT1 to OUT4 render respectively the transistors Q1, Q4 "ON", while render respectively the transistors Q2, Q3 "OFF". Thus, the electric current flows in the winding along a first direction from the middle terminal 22 to the start and end terminals 24, 26. On the contrary, in the other half of the operation period, the OUT2 and OUT3 are at a high voltage level, while the OUT1 and OUT4 are at a low voltage level. The voltage levels of the OUT1 to OUT4 render respectively the transistors Q2, Q3 "ON", while render respectively the transistors Q1, Q4 "OFF". Thus, the electric current flows in the winding along an opposite direction from the start and end terminals 24, 26 to the middle terminal 22. In the operation period, the direction of the electric current passing through the winding is reversed once. Repeated operations cause the electrical current to pass through the winding in alternate directions. As a result, the winding generates periodically alternate magnetic fields to drive the rotor of the motor to run.

In the stator 10 of the motor of the present invention, the electric current passes all the winding portions 20a–d at any time during operation. Thus, the winding is maximally utilized. With a same electrical current flowing through the winding, the motor in accordance with the present invention can output a larger torque than traditional motors. The efficiency of the motor of the present invention is therefore enhanced.

A test, comparing the performance of a cooling fan using a motor of the present invention with two known cooling fans which have been widely used in the related industry, is conducted. All of the fans for testing is 7015 series whose profile is 70(L)*70(W)*15(H) mm.

Figure 5:
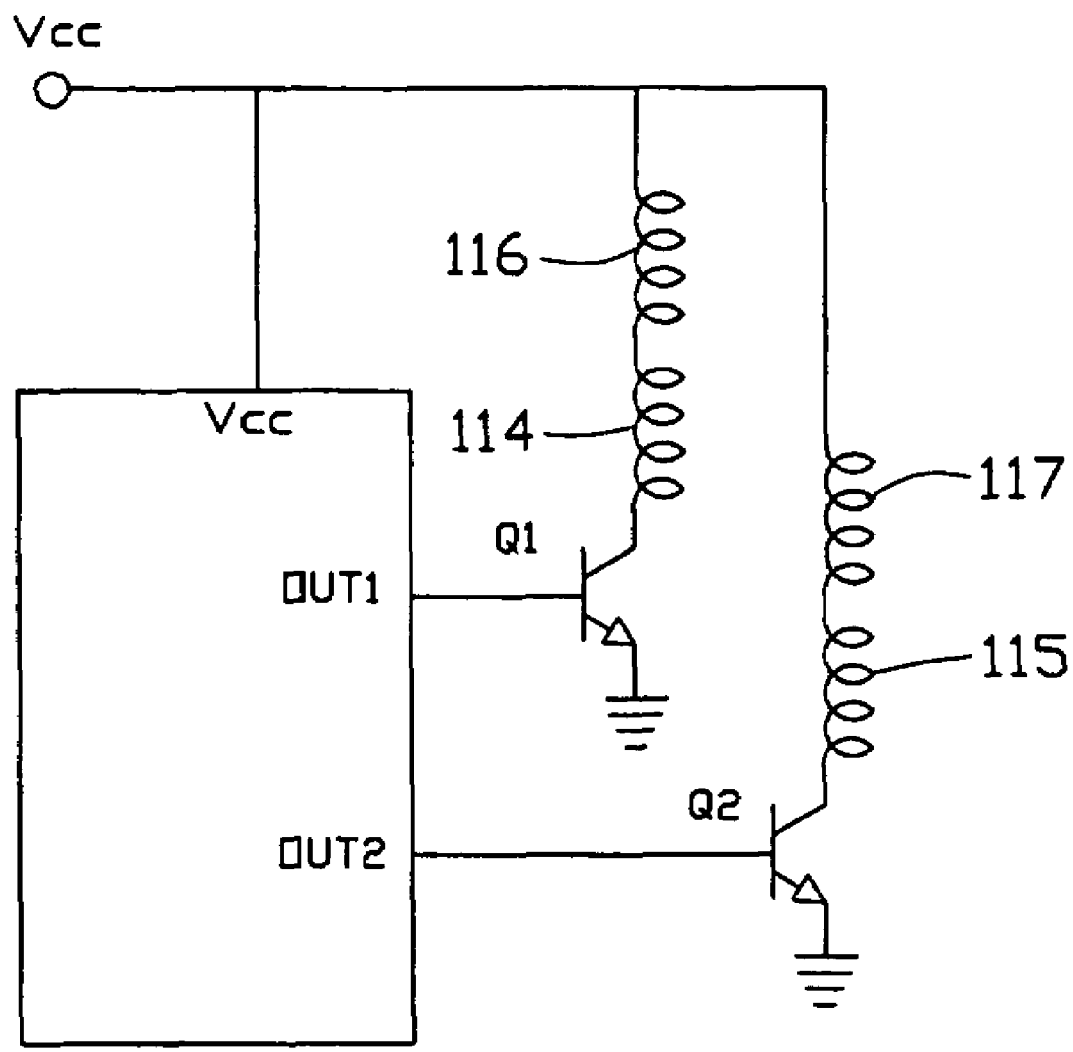
FIG. 5 is a schematic view of a circuit diagram for a known fan motor.

Known fan No. 1 has a motor with a driving circuit connection illustrated in FIG. 5. Two winding portions 116, 114 and another two winding portions 115, 117 of the winding are arranged in parallel. The electric current alternately passes through the two winding portions 116, 114 and the other two winding portions 115, 117 to establish alternate magnetic fields.

Figure 6:
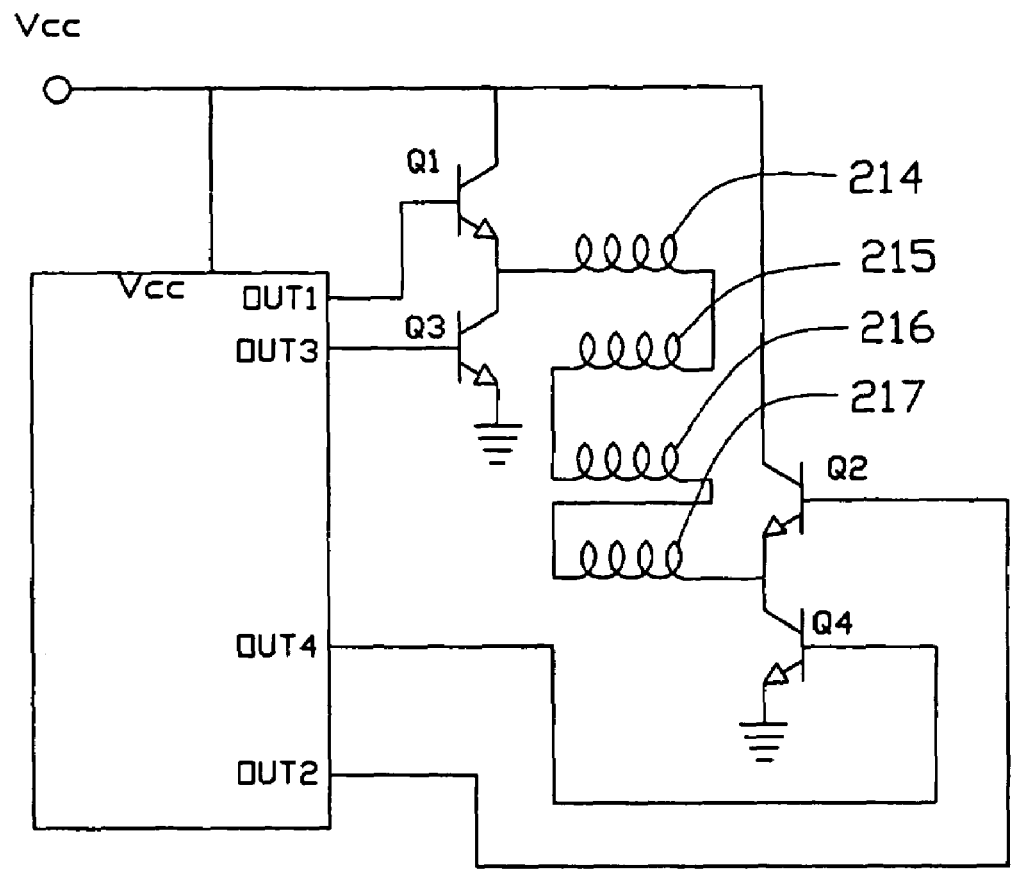
FIG. 6 is a schematic view of a circuit diagram for another fan known fan motor.

Known fan No. 2 has a motor with a driving circuit connection illustrated in FIG. 6. Four winding portions 214–217 of the winding are connected in series. The electric current passes the winding in alternate directions so as to establish alternate magnetic fields.

The result of the test is summarized in TABLE I.

TABLE I

| 7015 Series Fan | Known Fan No. 1 | Known Fan No. 2 | Present Fan |
| --- | --- | --- | --- |
| Rotational Speed | 5700 RPM | 5200 RPM | 5700 RPM |
| Electric current | 0.7 A | 0.42 A | 0.46 A |
| Winding Slot Occupation | Fully Occupied | Fully Occupied | Partly Occupied |

As TABLE I shows, a speed of 5700 RPM or 5200 RPM is achieved respectively by the know fan No. 1 or No. 2 with the winding slot being fully occupied by the winding. Since the winding slot is fully occupied, the known fans cannot provide more winding coils for enhancing the magnetic fields to increase the rotational speed thereof, i.e., the rotational speed of 5700 RPM and 5200 RPM are the maximal design speed that the respective known fans No. 1 and No. 2 are able to provide.

However, the fan using the stator of the present invention can provide the speed of 5700 RPM with the winding slot being partly occupied by the winding. Expectably, the fan using the present invention can provide a speed more than 5700 RPM if more winding is used to establish stronger magnetic fields. In addition, the electric current passing the winding of the fan in accordance with the present invention is less than that of the known fan No. 1, which means that, to provide the same CFM value, the fan of the present invention consumes less electrical power, and generates less heat so as to avoid much electrical energy loss during operation. Based on these test results, a better efficiency of the fan in accordance with the present invention is proved.

Figure 3:
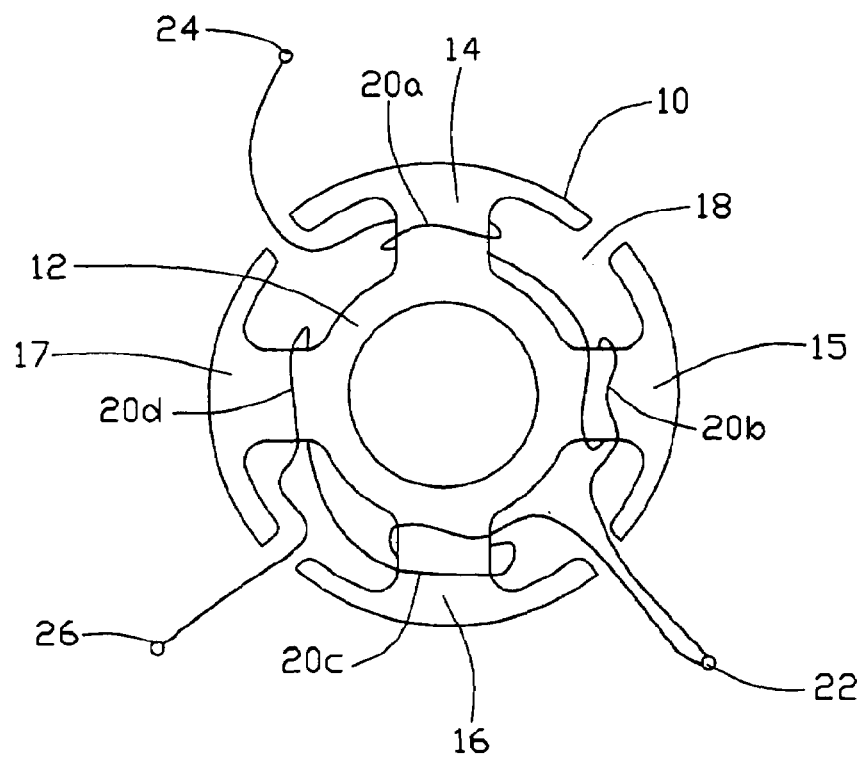
FIG. 3 is a schematic, top view of an alternative embodiment of the brushless direct current motor.

Referring to FIG. 3, a stator according to an alternative embodiment is shown. Different from the first embodiment, the winding of the stator of the alternative embodiment is wound around pole members 14, 15, and is then wound around pole members 16, 17 of the stator 10. That is, the winding portion 20a is wound in a counterclockwise direction around the pole member 14, and the wire of the winding 20 then extends to the pole member 15 with the winding portion 20b being wound therearound in a clockwise direction. The wire of the winding is then led out of the stator to form the middle terminal 22. Afterwards, the winding extends to the pole member 16 where the winding portions 20c is wound in the clockwise direction around the pole member 16, and it extends to the pole member 17 with the winding portion 20d being wound therearound in the counterclockwise direction. Finally, the end terminal 26 of the winding is led out of the stator.

Figure 4:
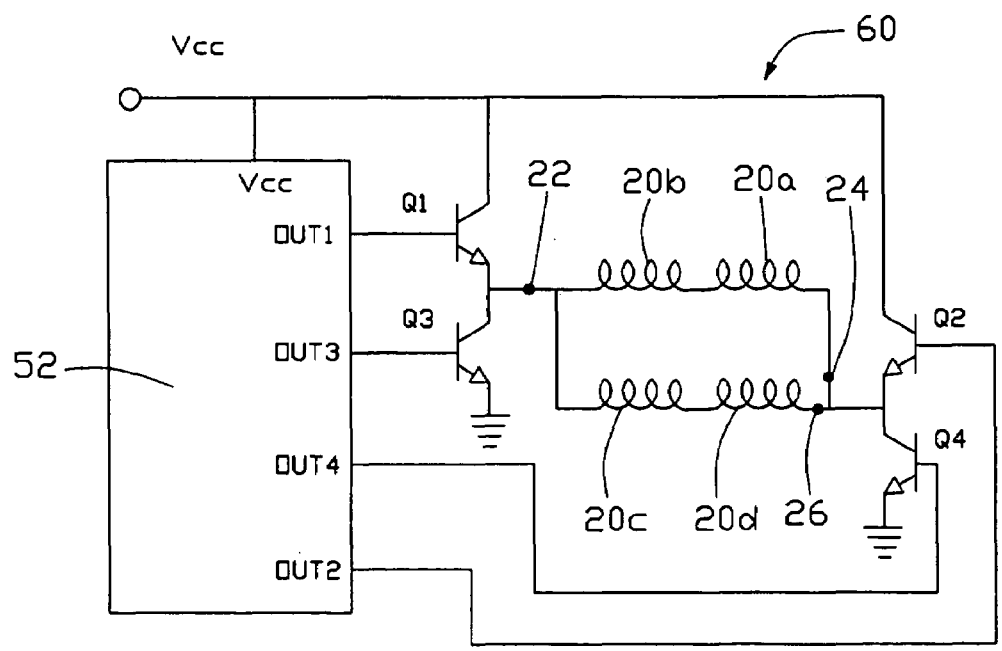
FIG. 4 is a schematic view of a circuit diagram for the motor of FIG. 3.

Referring to FIG. 4, different from the first embodiment, the winding portions 20a, 20b are connected in series, and the winding portions 20c, 20d are connected in series. The series-wound winding portions 20a, 20b are in a parallel connection with the series-wound winding portions 20c, 20d. The principle of the operation is similar with the first embodiment. That is, the electric current alternately flows through the winding from the middle terminal 22 to the start and end terminals 14, 26, or from the start and end terminals 14, 26 to the middle terminal 22, thereby establishing alternate magnetic fields to drive the rotor of the motor.

In the foregoing description, the stator has four pole members with four winding portions being wound therearound. Two series-wound winding portions and the other two series-wound winding portions are electrically arranged in parallel. It should be noted that the winding technique might be applied to any stator having an even number of pole members. A half of the pole members and the other half of the pole members are electrically arranged in parallel.

It is understood that the invention may be embodied in other forms without departing from the spirit thereof. The above-described examples and embodiments are to be considered in all respects as illustrative and not restrictive, and the invention is not to be limited to the details given above.

What is claimed is:

1. A stator for a brushless direct current motor, the stator comprising:
    a core member having a central portion with an even number of pole members extending radially and outwardly from the central portion;
    a winding having a same even number of winding portions wound around the pole members respectively; and
    a drive circuit having the winding connected thereto with an electric current passing through the winding periodically in alternate directions during working, wherein a half of the winding portions are arranged in parallel with the other half of the winding portions, and the electric current passes through the whole winding in a first direction during the first half of an operation period, while the electric current passes through the whole winding in an opposite second direction during the other half of the operation period.

2. The stator as described in claim 1, wherein the winding comprises start and end terminals, and a middle terminal led out from between the start and end terminals, and all the terminals are electrically connected to the drive circuit.

3. The stator as described in claim 2, wherein the drive circuit comprises two pairs of transistors, each pair of the transistors is arranged in a same manner that the emitter of one transistor is electrically connected to the collector of the other transistor, the collector of said one transistor is connected to power source, the emitter of said the other transistor is grounded, the middle terminal of the winding is electrically connected to a junction of one pair of the transistors, and the start and end terminals are commonly electrically connected to a junction or the other pair of the transistors.

4. The stator as described in claim 3, wherein the first direction is from the middle terminal toward the start and end terminals, and the second direction is from the start and end terminals to the middle terminal.

5. The stator as described in claim 3, wherein the drive circuit comprises an IC having output terminals electrically connected to the bases of the transistors, and during working the output terminals alternately output high or low voltage signals to selectively render the transistors ON or OFF to enable the electric current to pass through the winding in corresponding first or second direction.

6. The stator as described in claim 2, wherein the number of the pole members is four.

7. The stator as described in claim 6, wherein two of the winding portions are sequentially wound in a same direction around two opposite pole members, the other two of the winding portions are wound in the same direction around the other two opposite pole members, and the middle terminal is led out of the stator from between said two of the winding portions and said the other two of the winding portions.

8. The stator as described in claim 6, wherein two of winding portions are wound in opposite directions around two adjacent pole members, the other two of the winding portions are wound in opposite directions around the other two opposite pole members, and the middle terminal is led out of the stator from between said two of the winding portions and said the other two of the winding portions.

9. A stator for a motor comprising:
    a core member having an even number of pole members;
    a same even number of winding portions wound around the pole members respectively; and
    a drive circuit connected to the winding portions, wherein a half of the winding portions are electrically connected in series, the other half of the winding portions are electrically connected in series, and said half of series winding portions are electrically arranged with said other half of series winding portions in parallel, and wherein
    an electric current continuously and reversely passes through each of the winding portions in one operation period.

10. A stator for a motor comprising:
    a core member having an even number of pole members, each of said pole members being equipped with winding portions, respectively, under a condition that a polarization of each of said pole members derived from the corresponding wind portion is opposite to that of an adjacent one of said pole members in an alternative manner; and
    a drive circuit connected to the winding portions, wherein two pairs of transistors connected to a power source under a condition that in each pair an emitter of one of said pair is connected to a collector of the other of the same pair with a joint, and wherein the winding portions are arranged in a plurality of groups connected between two joints of the emitters and the corresponding collectors of said two pairs in a parallel relation with each other under a condition that each of said groups includes at least two winding portions in a series manner,
    whereby each of said winding portions is always activated during each operation period of the drive circuit.

11. A stator as described in claim 10, wherein said winding portions are derived from a same wire defining starting and ending points commonly located close to the same one of said two joints.

* * * * *